United States Patent [19]

Hagen

[11] Patent Number: 5,595,695
[45] Date of Patent: Jan. 21, 1997

[54] PROCESS FOR PREPARING MATTE FINISH ELASTOMER

[75] Inventor: Peter R. Hagen, Harbor Springs, Mich.

[73] Assignee: Sealex Inc., Harbor Springs, Mich.

[21] Appl. No.: 454,512

[22] Filed: May 30, 1995

[51] Int. Cl.⁶ ................................................. B29C 35/06
[52] U.S. Cl. ................. 264/83; 264/177.18; 264/178 R; 264/298; 264/331.11; 425/71; 425/445
[58] Field of Search ........................... 264/178 R, 177.1, 264/177.16–177.2, 298, 331.11, 83; 427/387; 425/71, 445

[56] References Cited

U.S. PATENT DOCUMENTS

| | | | |
|---|---|---|---|
| 2,635,293 | 4/1953 | Prance | 264/178 R |
| 2,820,252 | 1/1958 | Koch | 18/55 |
| 2,971,221 | 2/1961 | Schoenbeck | 264/178 R |
| 3,260,774 | 7/1966 | Harlow | 264/28 |
| 3,699,197 | 10/1972 | Egger | 264/40 |
| 3,781,400 | 12/1973 | Couchoud et al. | 264/210 |
| 3,787,552 | 1/1974 | Spencer et al. | 264/178 R |
| 3,803,274 | 4/1974 | Nakashima et al. | 425/71 |
| 4,061,704 | 12/1977 | Barter | 264/83 |
| 4,098,861 | 7/1978 | Bassani | 264/174 |
| 4,100,240 | 7/1978 | Bassani | 264/108 |
| 4,104,351 | 8/1978 | Blizzard et al. | 264/236 |
| 4,371,682 | 2/1983 | Hashimoto | 528/34 |
| 4,528,156 | 7/1985 | Fuka et al. | 264/236 |
| 4,552,713 | 11/1985 | Cavicchioli | 264/347 |
| 4,783,289 | 11/1988 | Shimizu et al. | 264/2 |
| 4,938,827 | 7/1990 | Leach et al. | 264/347 |
| 5,160,670 | 11/1992 | Hamada et al. | 264/6 |
| 5,160,681 | 11/1992 | Shimizu | 264/128 |
| 5,279,782 | 1/1994 | Yamamoto et al. | 264/236 |
| 5,338,574 | 8/1994 | O'Neil et al. | 427/387 |
| 5,401,781 | 3/1995 | Hagen | 264/178 R |

FOREIGN PATENT DOCUMENTS

| | | | |
|---|---|---|---|
| 3003156 | 8/1981 | Germany | 264/347 |
| 1244484 | 9/1971 | United Kingdom | 264/178 R |

*Primary Examiner*—Jeffery R. Thurlow
*Attorney, Agent, or Firm*—Gifford, Krass, Groh, Sprinkle, Patmore, Anderson & Citkowski, P.C.

[57] ABSTRACT

An elastomeric article having a matte finish is prepared by curing a hydrolyzable composition under conditions of elevated humidity, or by including short aramid fibers therein. Disclosed herein are particular processes for the preparation of matte finished silicone rubber articles in a continuous extrusion process.

22 Claims, 1 Drawing Sheet

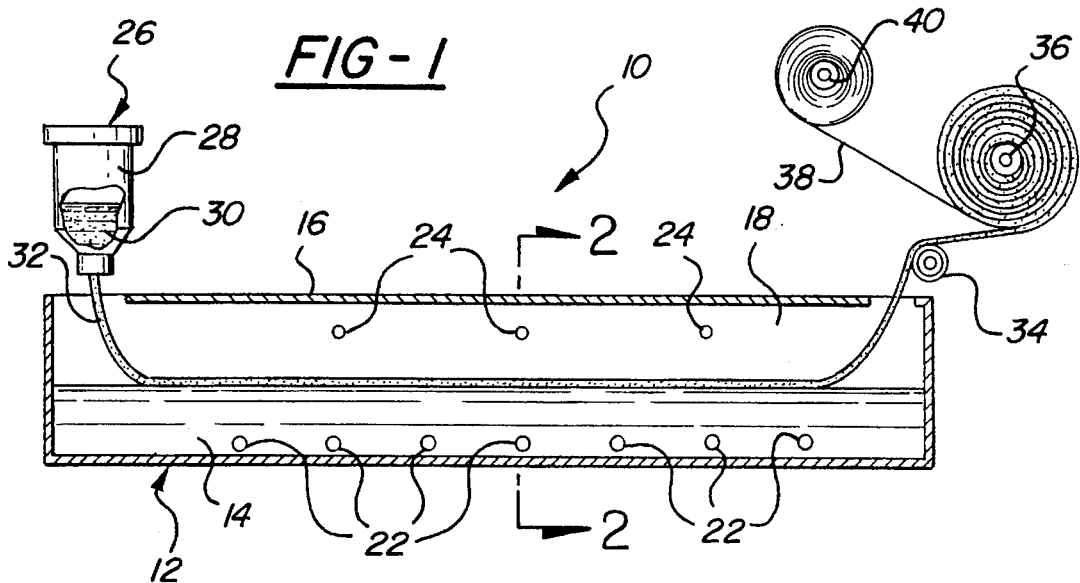
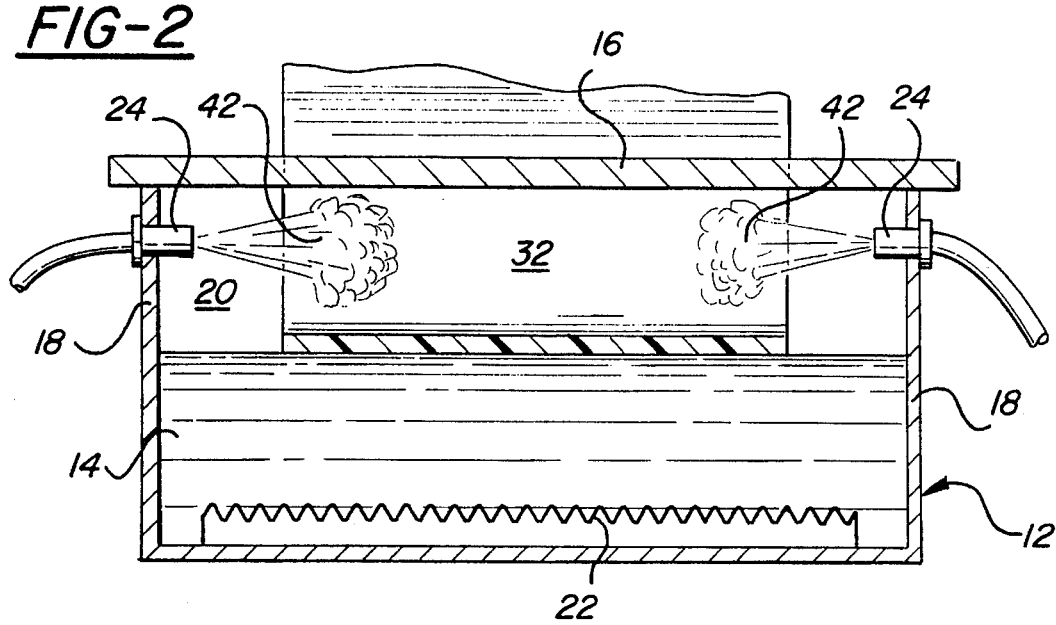
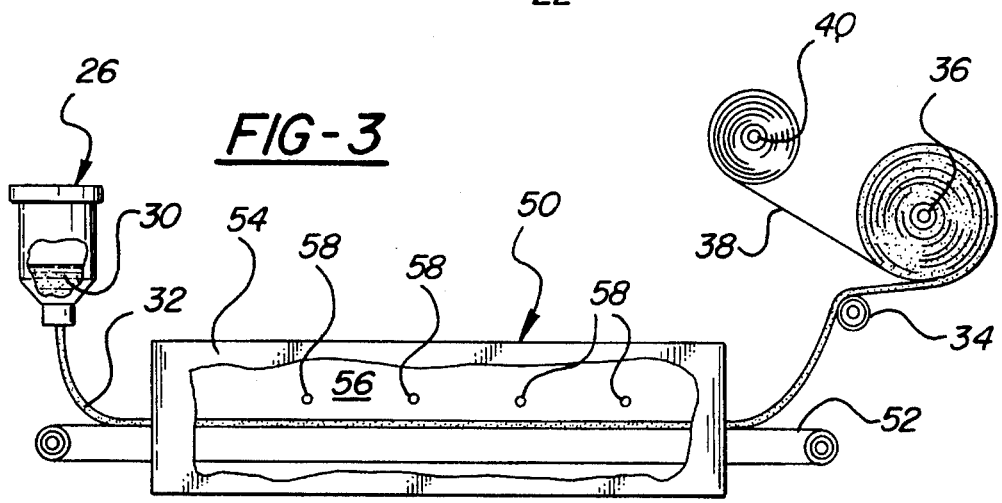

PROCESS FOR PREPARING MATTE FINISH ELASTOMER

FIELD OF THE INVENTION

This invention relates generally to the manufacture of elastomeric articles. More specifically, the invention relates to the fabrication of elastomeric articles having a matte surface finish. Most specifically, the invention relates to the fabrication of silicone rubber articles having a matte finish.

BACKGROUND OF THE INVENTION

Elastomeric materials have long been used as gaskets, seals and other like components of architectural structures, vehicles, appliances and other such articles of manufacture. For example, in the field of architecture, elastomeric architectural strips are used to cover joints between building sections, at roof lines and around windows, both in new construction and as a repair item for preexisting buildings. Silicone polymers are particularly important in the fabrication of architectural strips. These polymers are extremely flexible and strong, and their inertness makes them resistant to oxidation and photodegradation. Silicone rubbers may be fabricated in a variety of colors by the inclusion of pigments therein, so as to match a variety of substrates.

A wide variety of elastomeric articles, such as architectural strips, gaskets and the like are frequently prepared from silicones or other polymeric compositions by a process in which resin composition is extruded to provide a shaped body which is subsequently cured to produce the finished item. In the context of the present disclosure, an extrusion process is defined to include any forming process wherein a precursor of the elastomer is forced under pressure into or through a shaping member such as a die or a mold to produce a shaped body. A number of shaping processes are known in the prior art. For example, U.S. Pat. No. 4,783,289 discloses a continuous extrusion process for the preparation of elongated silicone rubber members. According to the process, a silicone composition is extruded from a die into a body of water to produce an elongated member which passes through the body of water, and cures while it is doing so.

Elastomeric articles produced through extrusion processes of the prior art tend to cure with a very smooth surface. In many instances, this smooth surface is not desirable in the article. For example, in architectural applications, it is generally desirable that joints and seals blend in with the appearance of the building, and the glossy surface of the elastomer contrasts strongly with the texture of stone, wood, concrete and other such building materials. In some instances, it is desirable to apply paint or other coatings to an elastomeric body, and such coatings often adhere poorly to a highly glossy surface. For reasons such as these, the prior art has made various efforts toward providing a matte finish on extruded elastomeric items. For example, a matte finish can be provided to an item by curing the elastomer within a mold having a textured surface. This approach is impractical when very large, or long, items such as architectural strips are being fabricated, or when the residence time of the article in the mold is a factor in the logistics or economics of the molding process. In another approach, a textured surface is provided to the cured article by brushing, sanding or otherwise abrading the surface. This approach constitutes an additional processing step and is not always practical, particularly when the items being manufactured have large or complex, surfaces. In yet another approach, the finished articles are provided with a textured surface by overcoating them with another material. Again, this requires a complicated post-processing step, and the technique often is not applicable when the item includes surface characteristics which would be masked by the top coat.

It will be appreciated that there is a need for a process by which elastomeric articles, particularly silicone rubber elastomeric articles, having a matte finish may be fabricated. The process should not require any post-cure processing steps nor should it require any long residence time of the article in a shaping die or mold during the curing process. It is further desirable that any such technique be compatible with continuous fabrication processes such as those used for the extrusion of silicone rubber strips. It is also desirable that any such technique not require extensive modification of presently employed processing equipment.

The present invention is directed to a process for the manufacture of elastomeric articles having a matte finish. The process is particularly suited for the fabrication of silicone rubber articles and may be implemented in a continuous fabrication process, such as that used for the manufacture of elongated architectural strips. The method of the present invention is simple to implement and control, and provides high quality, matte finished, cured, elastomeric articles. These and other advantages of the present invention will be readily apparent from the drawings, discussion and description which follow.

BRIEF DESCRIPTION OF THE INVENTION

There is disclosed herein a method for fabricating a cured, elastomeric article having a matte finish. In accord with the invention, there is provided a composition which includes a hydrolyzable siloxane which is curable to produce an elastomer. The composition is extruded through a forming member so as to produce a shaped body of the composition. The shaped body is maintained in an atmosphere having a relative humidity in the range of 75–100% so that a free surface of the body is exposed to the atmosphere for a period of time sufficient to permit the body to cure into a self supporting elastomer. Exposure to the humid atmosphere causes the free surface to cure with a matte finish.

In a specific embodiment of the invention, the humidity is maintained in the range of 90–100%. In one specific process, the composition is a low viscosity composition and in the extrusion step it is extruded into a liquid bath so that the shaped body is supported by the surface of the bath with its free surface outside of the bath. In a further embodiment, the bath may include a cover spaced from the liquid thereof so as to define a head space between the liquid and the cover. In this embodiment, the head space encloses the high humidity atmosphere. In particular embodiments, the bath is a water bath and it may be a heated water bath.

In other embodiments, the shaped body may be extruded onto various other supports such as a conveyor belt and the like, and the composition may be a high viscosity, self supporting composition.

BRIEF DESCRIPTION OF THE DRAWINGS

FIG. 1 is a schematic, longitudinal, cross sectional view of one apparatus for carrying out the method of the present invention;

FIG. 2 is a transverse, cross sectional view of the apparatus of FIG. 1 taken along line 2—2; and FIG. 3 is a side elevational view, partially cut away, of another embodiment of apparatus for carrying out the method of the present invention.

DETAILED DESCRIPTION OF THE INVENTION

In accord with the present invention, a shaped body of material, which is curable to produce an elastomer is exposed to high humidity during at least a portion of its curing cycle and thereby cures with a matte surface. The invention is of particular advantage in combination with elastomeric materials which are formed, at least partially, from hydrolyzable precursor materials. The invention is most particularly implemented in connection with the fabrication of silicone rubber articles from compositions including hydrolyzable siloxanes; although it is to be understood that it may be advantageously practiced with other polymeric materials which undergo a hydrolysis step in their curing process. Referring now to FIG. 1, there is shown stylized depiction of an apparatus 10 as configured for the practice of the present invention. The apparatus 10 includes a tank 12 having a volume of liquid 14, which is typically water, contained therein. The apparatus 10 further includes a cover 16 which is supported by the side walls 18 of the tank 12, in a spaced apart relationship with the top surface of the liquid 14 so as to define a head space 20 disposed between the liquid 14 and the cover 16.

The apparatus 10 further includes a number of heaters 22 disposed in the liquid 14 and a series of nozzles 24 supported by the side wall 18 of the tank 12 in the head space 20. The apparatus further includes an extruder 26, in communication with a supply of material which is curable to form the elastomer. The extruder 26 includes a mixer portion 28 for mixing and supplying a stream of the pre-elastomer composition under pressure, and further includes a forming member 30, which in this case comprises an extrusion die. An extrusion apparatus of this type is well known in the art.

In operation, the extruder 26 operates to provide a shaped body of the pre-elastomer composition 32 and to extrude this body onto the surface of the liquid 14 in the tank 12. The body of material 32 begins to cure as it is extruded. Curing takes place, as will be explained in greater detail hereinbelow, as a result of a chemical reaction involving hydrolysis of various siloxane compounds and can be enhanced by the addition of curing agents, catalysts and the like and can be further enhanced by the application of heat. The composition 32 is supported by the liquid 14 so that the lower surface thereof is in contact with the liquid and an upper surface referred to herein as the free surface, is exposed to the atmosphere in the head space 20. The extruded body 32 travels along the length of the tank 12, and this travel may be facilitated by establishing a flow of the liquid 14 along the length of the tank as for example by inclusion of a pump (not shown). The length of the tank, the temperature of the liquid, and the speed of the extrusion are selected so that the extruded body 32 is cured to a sufficient degree to be self supporting by the time it reaches the end of the tank. After leaving the tank, the at least partially cured, self-supporting body is directed by a first turning roller 34 onto a take up roller 36. As is known in the art, a layer of interleaf material 38, dispensed from interleaf roll 40, may be interwound with the elastomer onto the take up roller 36 so as to prevent sticking. The interleaf 38 may comprise a layer of polymeric film, a strip of paper or the like. The interleaf is optional and facilitates rolling and unrolling of the elastomer. As is known in the art, the take up roll 36 may be driven by a motor, not shown. In some instances, tension provided by the take up roller 36 may be employed to advance the extruded body 32 through the tank 12.

Referring now to FIG. 2, there is shown a cross sectional view of the apparatus 10 of FIG. 1 taken along line 2—2. Depicted in FIG. 2 is the tank 12 having a volume of liquid 14 therein and further including a top cover 16 supported by side walls 18 of the tank 12. As described above, the cover 16 is supported in a spaced apart relationship with the top surface of the liquid 14 so as to define a head space 20 therebetween. The side walls 18, in this embodiment, include nozzles 24 operative to introduce water vapor 42 into the head space 20. The water vapor 42 may be in the form of steam provided from a boiler, not shown, or it may be a finely nebulized mist supplied from a high pressure nozzle, an ultrasonic nebulizer or the like. Also illustrated in FIG. 2 is a heater 22, which in this instance is shown as an electrical resistance heater disposed so as to warm the liquid 14. A body of extruded material 32 is shown in the tank 12 as supported on the surface of the liquid 14. In general, density of the liquid 14 and the extruded polymer will be selected such that the polymer will readily rest atop the liquid surface. Toward that end, the liquid 14 should have a density comparable to the polymer; however, in the instance where the extruded material 32 is a highly hydrophobic material such as a silicone, and the liquid 14 is water, surface tension will serve to support the body 32 atop the liquid 14 even though the density of the body 32 is greater than that of the liquid 14. If necessary, the density of the liquid 14, may be adjusted by the addition of salts or the like.

According to the present invention, the head space 20 provides a high humidity atmosphere which contacts the free surface of the body 32 during at least a portion of the time in which it is curing. It has been found that the high humidity atmosphere promotes formation of a matte finish on the free surface. This is a surprising finding, given the fact that the surface of the body 32 which is in contact with the liquid 14 cures with a gloss finish, even when the liquid 14 is water. Applicant does not wish to be bound by theory, but speculates that under high humidity conditions, microdroplets of water condense on the free surface in a continuous pattern, and this microcondensation may promote the formation of the matte finish. In general it has been found that humidities greater than 60% will promote formation of a matte finish. Preferably, the humidity is in the range of 75–100% and most preferably 90–100%.

Often it is desirable to heat the liquid 14 to further accelerate curing of the elastomer. In those instances, where the liquid is a water based liquid, and where it is heated to an elevated temperature, the presence of the cover 16 will be sufficient to provide adequate humidity in the head space 20 to facilitate formation of the matte finish. In some instances, particularly when the liquid 14 is cool, or when the liquid is non-aqueous, external water vapor may be provided from the nozzles 24 as described above.

One typical process for the preparation of an extruded body of silicone rubber may be carried out utilizing a hydrolyzable siloxane composition of the type comprising a polydiorganosiloxane having at least two silicon-bonded hydrolyzable groups per molecule, a hydrolyzable silicone crosslinker, a filler and an optional curing catalyst. A preferred polydiorganosiloxane can be described by one of the two following general formulas:

$$HO(R_2SiO)_xH$$

and $$Q_aR_{(3-a)}SiO(R_2SiO)_xSiR_{(3-a)}Q_a$$

in which Q is a hydrolyzable group, R is a monovalent hydrocarbon radical, a is 1, 2, or 3 and x has an average value such that the viscosity of the polydiorganosiloxane is about 1 to 500 Pa.s at 25° C. The hydrolyzable group, Q, can be any of those which react with water (moisture) and are hydrolyzed. Examples of the hydrolyzable groups include alkoxy, alkenoxy, acyloxy, ketoximo, N-methylbenzamido, and similar groups. Examples of the monovalent hydrocarbon radicals include alkyl, e.g. methyl, ethyl, propyl, butyl, isopropyl, and octyl; alkenyl, e.g. vinyl, allyl, and hexenyl; cycloalkyl, e.g. cyclopentyl and cyclohexyi; aryl, e.g. phenyl, tolyl, and xylyl; and aralkyl, e.g. 2-benzylethyl. The value of x is preferably one which provides a viscosity of about 100 to 500 Pa.s at 25° C. The polydiorganosiloxane having at least two silicon-bonded hydrolyzable groups can be one type of polydiorganosiloxane or a mixture of different types. Polydiorganosiloxanes useful in the present process are commercially available. The type of polydiorganosiloxane endblocking group depends for the most part upon the type of hydrolyzable groups of the crosslinker.

The hydrolyzable silicone crosslinker has at least three silicon-bonded hydrolyzable groups per molecule preferably three or four. The hydrolyzable groups include acyloxy groups, e.g. acetoxy, octanoyloxy, and benzoyloxy; ketoximo groups, e.g. dimethylketoximo, methyiethylketoximo, and diethylketoximo; alkenyloxy groups such as isopropenyloxy and 1-ethyl-2-methylvinyloxy; and amino groups, e.g. dimethylamino, butylamino, diethylamino, and cyclohexylamino; aminoxy groups, e.g. dimethylaminoxy and diethylaminoxy; and amido groups, e.g. N-methylacetamido, N-ethylacetamido, and N-methylbenzamido. The hydrolyzable silicone crosslinker may be a polyalkoxy-silicon crosslinker. Examples of the polyalkoxy-silicon crosslinker include tetraalkyl ortho silicate, e.g. tetraethyl ortho silicate, tetra-n-propyl ortho silicate, tetraisopropyl ortho silicate, and tetraburtyl ortho silicate; alkylpolysilicate, e.g. ethylpolysilicate, n-propylpolysilicate, and butylpolysilicate; and other polyalkoxy-silicon compounds. Hydrolyzable silicon compound crosslinkers useful in the present process are commercially available.

The filler can be a reinforcing filler or an extending filler or a combination of both. The filler can be treated or untreated. Examples of reinforcing fillers include fumed or precipitated silica, silica aerogel, and silica xerogel. A preferred silica treating agent is hexamethyldisilazane. Examples of extending fillers include titanium dioxide, diatomaceous earth, iron oxide, aluminum oxide, zinc oxide, quartz, calcium carbonate, magnesium oxide, carbon black, graphite, glass fibers, glass microspheres, glass microballoons, glass beads, carbon fibers, silicon carbide, polystyrene beads, metal fibers, and the like. A preferred treating agent for calcium carbonate is stearic acid. Fillers and treating agents useful in the present process are commercially available.

One particularly preferred filler comprises aramid fibers such as Kevlar® fibers. It has been found that in addition to functioning as a filler, aramid fibers also impart a further matte finish to silicone elastomers. This finish enhances the aesthetic appeal of the items and makes them more receptive to paint and other top coats. Preferably, the fibers are present in the form of finely chopped stock of approximately 0.1 to 1 mm, and more preferably 0.5 mm, in length. Diameter of the stock is preferably 1–10 microns. It has been found that about 0.1 to 1% by weight of fibers are desirable and the inclusion of a little as 0.1 g of fiber per 75 g of resin produces a desirable texture. The texture is developed independently of the texture provided by the humidity, and this aspect of the invention may be practiced independently thereof, or in conjunction with the high humidity atmosphere.

The hydrolyzable siloxane composition optionally comprises a curing catalyst to accelerate the condensation-type crosslinking reactions. Examples of curing catalysts include tin catalysts, e.g. dibutyltindilaurate, dibutyltindiacetate, stannous octoate, and stannous 2-ethylhexanoate, and other similar compounds. Examples of the curing catalyst also include other metal salts of carboxylic acid, e.g. metal carboxylates in which the metal atoms may include iron, cobalt, manganese, and zinc; organo titanate and chelated titanates, e.g. tetrabutyl titanate, tetra(isopropyl) titanate, tetra(2-ethylhexyl) titanate, and diisopropoxy-bis-(acetoacetonate) titanium; and the like. Curing catalysts useful in the present process are commercially available.

One preferred composition comprises a hydroxyl-endblocked polydiorganosiloxane, a hexamethyldisilizane treated silica, a stearated calcium carbonate, a polyalkoxy-silicon crosslinker, and a curing catalyst. Among these preferred compositions, the hydroxyl-endblocked polydiorganosiloxane is preferably a hydroxyl-endblocked polydimethylsiloxane, the polyalkoxy-silicon crosslinker is tetra(n-propyl) ortho silicate, and the catalyst is a tin catalyst. The preferred hydrolyzable siloxane compositions are preferably in a two package delivery form wherein one package comprises the polydiorganosiloxane and filler(s) and a second package comprises the polyalkoxy-silicon crosslinker and the catalyst. Two-part delivery helps to prevent premature curing of the composition.

Other additives commonly used in silicone sealants can be used in the hydrolyzable siloxane compositions of the present process, such as colorants, e.g. pigments and dyes; fungicides; solvents; adhesion promoters; anti-oxidants; cure regulators; plasticizers such as silicone fluids, e.g. trimethylsiloxy-endblocked polydimethylsiloxane having a viscosity in the range of about 0.1 to 1 Pa.s at 25° C.; and pacifiers, e.g. low molecular weight silanol polyorganosiloxanes; and the like. Such additives are commercially available.

There is no specific restriction on the ratios of the components of the hydrolyzable siloxane composition. However, the ratio of components should be selected so that the hydrolyzable groups of the polydiorganosiloxane, and incidental moisture which may be present, such as moisture on the filler, and the hydrolyzable groups of the crosslinker are present in ratios that promote cure after the composition is extruded into the aqueous curing bath and during the retention time in the aqueous curing bath. In the preferred composition, the hydrolyzable silicon crosslinker is present in a slight excess to inhibit curing before the shaped extrusion enters the aqueous curing bath, and to promote curing from the outside of the shaped extrusion inward. Similarly, the type and amount of catalyst should be selected to effect cure within the retention time in the aqueous curing bath.

The components are mixed together by standard means that provide a homogeneous mixture. The preferred mixing apparatus is an in-line dynamic mixer wherein the components are fed at a constant rate in a non-pulsating manner into one end of the mixer and the mixture is extruded at a constant rate through a shaping die located at the opposite end of the mixer. For extruding, the composition is maintained at a temperature greater than 5° C., preferably in a range of about 10° C. to 25° C.

The mixed composition is extruded through a shaping die which is held by a die holder attached to the outlet of the container which holds the mixed composition. Preferably the composition is extruded through a shaping die held by a die holder attached to the mixing apparatus. The shaping die is a simple plate die of metal or plastic. A complicated or rugged die is not required because the composition is of a liquid or paste viscosity so the pressures necessary for extrusion are relatively low, obviating the need for high strength constructions. The pressures typically employed are in a range of about 100–500 psi.

The foregoing represent one preferable group of compositions and extrusion method which may be utilized in the practice of the present invention. These materials may be extruded into a water bath maintained at a temperature of approximately 70°–80° C. in an apparatus generally similar to that of FIGS. 1 and 2. The relative humidity in the head space is approximately 90%, and the extrusion speed is adjusted so that the transit time of the extrusion through the tank is approximately four minutes. Materials prepared in accord with this process comprise high quality, high strength silicone rubber extrusions having a gloss finish on the surface which was in contact with the water, and a matte finish on the free surface.

Although the foregoing description primarily concerned low viscosity silicone extrusions, the present invention may be carried out in connection with other materials and other curing apparatus. Referring now to FIG. 3, there is shown another apparatus carrying out the present invention. The apparatus 50 of FIG. 3 is depicted in side elevation, with a portion thereof cut away. The apparatus includes a conveyor belt 52 which passes through a curing tunnel 54. The tunnel defines an enclosed curing space 56 which is configured to contain a high humidity atmosphere therein. Toward that end, the curing tunnel 54 includes a number of water vapor inlets 58 in communication with the curing space 56. These inlets 58 are generally similar to the nozzles 24 described with reference to FIG. 2. Although not illustrated, the curing tunnel may further be provided with a heat source, such as a number of infrared heaters or the like to facilitate curing.

The apparatus 50 of FIG. 3 operates in a manner analogous to the apparatus shown in FIGS. 1 and 2. Toward that end, an extruder 26, generally similar to that previously described is included. In operation, the extruder 26 extrudes a body of material 32 onto the conveyor belt 52. In the apparatus of FIG. 3, the extruded material is preferably of higher viscosity than the material employed in connection with the FIG. 1 apparatus. Generally, the material is self-supporting in its extruded state, although it needs a final cure to become fully elastomeric. The material is extruded onto the conveyor belt 52 which is driven by a motor (not shown). The conveyor carries the extruded material 32 through an inlet opening in the curing tunnel 54 and exposes the material to an elevated humidity therein. The cured material exits the curing tunnel 54 and is directed onto a take up roller 36 by a turning roller 34 and protected with an interleaf 38 from an interleaf roller 40 as generally described with regard to FIGS. 1 and 2.

It is to be understood that in the practice of the present invention, curing elastomeric material is contacted with a high humidity atmosphere to produce a matte finish thereupon. The high humidity atmosphere need not contact the material during the entirety of its cure cycle; however, it has been found important to contact the material with the high humidity in the earlier stages of its cure. For example, the material may be partially cured in a high humidity atmosphere and then wound on a roller otherwise stored to effect final curing.

It is also to be understood that while the invention has been described in general with reference to curing of elongated bodies in a continuous process, the invention may be also adapted to processes for curing discreet items in either a batch or continuous process. While the invention has primarily been described with reference to silicone compositions, other moisture responsive compositions including urethanes and the like may be provided with matte finishes in accordance with the present invention.

In view of the foregoing, it is to be understood that the drawings, discussion and description herein are merely meant to represent particular embodiments of the invention and are not meant to be a limitation upon the practice thereof. It is the following claims, including all equivalents, which define the scope of the invention.

I claim:

1. A method for fabricating a cured, elastomeric article having a matte finish, from a hydrolyzable siloxane composition, said method comprising the steps of:

providing a composition including a hydrolyzable siloxane, said composition being curable to produce an elastomer;

extruding said composition so as to produce a shaped body of said composition;

maintaining said body in a humid atmosphere having a relative humidity in the range of 75–100%, so that a free surface of said body is exposed to said humid atmosphere for a period of time sufficient to permit said body to at least partially cure into a self-supporting elastomer;

whereby said humid atmosphere promotes the formation of a matte finish on said free surface.

2. A method as in claim 1, wherein the step of maintaining said body in a humid atmosphere having a relative humidity in the range of 75–100% comprises maintaining said body in an atmosphere having a relative humidity in the range of 90–100%.

3. A method as in claim 1, wherein said composition is a low viscosity composition and said step of extruding said composition comprises extruding composition into a liquid bath so that the shaped body is supported by said bath with the free surface of said body out of the bath.

4. A method as in claim 3, wherein said bath is a water bath.

5. A method as in claim 3, wherein said bath includes a cover spaced from the liquid thereof so as to define a head space between the liquid and the cover, said head space enclosing said humid atmosphere.

6. A method as in claim 5, wherein said bath is a water bath which is maintained at a temperature in excess of 30° C. and wherein said cover is operative to retain water vapor in said head space.

7. A method as in claim 5, including the further step of injecting water vapor into said head space.

8. A method as in claim 1, wherein said composition comprises a polydiorganosiloxane having at least two silicon bonded hydrolyzable groups per molecule, a hydrolyzable silicon crosslinker, a filler, and optionally a curing catalyst.

9. A method as in claim 8, wherein said filler comprises aramid fibers.

10. A method as in claim 1, wherein the step of maintaining said body in a humid atmosphere having a relative humidity in the range of 75–100% comprises maintaining said body in a covered space.

11. A method as in claim 10, including the further step of injecting water vapor into said covered space.

12. A method as in claim 1, wherein the step of extruding said composition comprises extruding said composition onto a support member which retains the shaped body thereupon so that said free surface is exposed to said humid atmosphere.

13. A method as in claim 12, wherein said support comprises a moving conveyor.

14. A method as in claim 12, wherein said support comprises a liquid.

15. A method as in claim 1, wherein said composition comprises a high viscosity material and wherein said shaped body is a self-supporting shaped body.

16. A method for continuously fabricating an elongated, cured, elastomeric article having a matte finish, from a hydrolyzable siloxane composition, said method comprising the steps of:

providing a composition consisting essentially of a polydiorganosiloxane having at least two silicon bonded hydrolyzable groups per molecule, a hydrolyzable silicon crosslinker, a filler and optionally a curing catalyst, said composition being curable to produce an elastomer;

providing a water bath, said bath being contained in an elongated trough having a covered top surface, said top surface being spaced apart from an upper surface of said water so as to define a head space therebetween;

extruding said composition through a die so as to produce an elongated body of said composition;

directing said elongated body into said water bath, so that said elongated body is supported on the surface of said bath with a free surface thereof exposed out of the bath;

maintaining an atmosphere having a relative humidity in the range of 75–100% within at least a portion of said head space;

advancing said elongated body along the surface of said water bath for a period of time sufficient to at least partially cure said body into a self-supporting elastomer, while exposing said free surface to the atmosphere having a relative humidity in the range of 75–100%;

whereby exposure to said atmosphere promotes the formation of a matte finish on the free surface of said body.

17. A method as in claim 16, including the further step of maintaining said bath at a temperature in excess of 30° C. and wherein the step of providing an atmosphere having a relative humidity in the range of 75–100% is accomplished by evaporation from said body of water.

18. A method as in claim 16, wherein said water includes material dissolved therein which increases the density of said water.

19. A method as in claim 18, wherein said material comprises a salt.

20. A method as in claim 18, wherein said material comprises glycerol.

21. A method as in claim 16, including the further step of adding chopped aramid fibers to the composition prior to the extruding step.

22. A method for fabricating a cured, silicone elastomeric article having a matte finish, from a hydrolyzable siloxane composition, said method consisting essentially of the steps of:

providing a composition including a hydrolyzable siloxane, a filler which comprises chopped aramid fibers, and optionally a curing catalyst;

extruding said composition so as to produce a shaped body of said composition; and at least partially curing said body into a self-supporting elastomer;

whereby the presence of said aramid fibers causes said body to cure with a matte finish.

* * * * *